US008296126B2

(12) United States Patent
Vuong

(10) Patent No.: US 8,296,126 B2
(45) Date of Patent: Oct. 23, 2012

(54) SYSTEM AND METHOD FOR MULTI-LINGUAL TRANSLATION

(75) Inventor: Thanh Vinh Vuong, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 1055 days.

(21) Appl. No.: 10/785,189

(22) Filed: Feb. 25, 2004

(65) Prior Publication Data
US 2005/0187774 A1 Aug. 25, 2005

(51) Int. Cl.
G06F 17/28 (2006.01)

(52) U.S. Cl. ........... 704/5; 716/6; 715/264; 715/236; 715/230; 715/224; 709/217; 709/206; 709/203; 707/3; 704/9; 704/8; 704/4; 704/3; 704/277; 704/2; 704/10; 704/1; 340/7.31

(58) Field of Classification Search .......... 704/3, 4, 704/9, 8, 5, 277, 2, 10, 1; 709/203, 217, 709/206; 716/6; 715/264, 236, 230, 224; 707/3; 340/7.31
See application file for complete search history.

(56) References Cited

U.S. PATENT DOCUMENTS

| 5,023,786 | A | * | 6/1991 | Kugimiya et al. ............ 704/4 |
| 5,295,068 | A | * | 3/1994 | Nishino et al. .............. 704/10 |
| 5,303,150 | A | * | 4/1994 | Kameda ..................... 704/9 |
| 5,523,946 | A | | 6/1996 | Kaplan et al. |
| 5,550,741 | A | | 8/1996 | Nakajima |
| 5,587,902 | A | * | 12/1996 | Kugimiya ................... 704/2 |
| 5,787,386 | A | * | 7/1998 | Kaplan et al. .............. 704/8 |
| 5,884,246 | A | * | 3/1999 | Boucher et al. .............. 704/2 |
| 5,991,713 | A | * | 11/1999 | Unger et al. ................ 704/9 |
| 6,049,697 | A | * | 4/2000 | Scozzarella et al. ......... 340/7.31 |
| 6,161,082 | A | * | 12/2000 | Goldberg et al. ............ 704/3 |
| 6,233,545 | B1 | * | 5/2001 | Datig ..................... 704/2 |
| 6,311,150 | B1 | * | 10/2001 | Ramaswamy et al. ........... 704/1 |
| 6,438,515 | B1 | * | 8/2002 | Crawford et al. ............. 704/5 |
| 6,453,338 | B1 | * | 9/2002 | Shiono ................... 709/206 |
| 6,658,627 | B1 | * | 12/2003 | Gallup et al. .............. 715/236 |
| 6,732,341 | B1 | * | 5/2004 | Chang et al. ............... 716/108 |
| 6,999,916 | B2 | * | 2/2006 | Lin et al. ................. 704/8 |

(Continued)

FOREIGN PATENT DOCUMENTS

| EP | 1130523 A2 | 9/2001 |
| EP | 1298535 A2 | 4/2003 |
| WO | WO 02/082775 | 10/2002 |

OTHER PUBLICATIONS

Anonymous: "SMS Translation". LINGOPHONE.COM, [Online], Jan. 8, 2004, XP002299358. Retrieved from the Internet: URL: <http//www.lingophone.com/faq.shtml> (retrieved on Oct. 5, 2004.

(Continued)

Primary Examiner — Michael Colucci
(74) Attorney, Agent, or Firm — Norton Rose Canada LLP

(57) ABSTRACT

The present invention relates to the translation of a portion of text to be communicated in a text-based communication in a communications network. A communications device for composing the text-based communication queries a translation service with a portion of text in a first language to obtain a replacement for the portion in a second language. A user may trigger a replacement query by composing the portion using at least one trigger symbol monitored by the communications device. Replacement may be confirmed with the user and at least one alternative replacement sought in response to the confirmation. The communications network may comprise a wireless network and the communications device a wireless mobile communications device.

21 Claims, 6 Drawing Sheets

U.S. PATENT DOCUMENTS

| | | | |
|---|---|---|---|
| 7,027,975 B1* | 4/2006 | Pazandak et al. | 704/9 |
| 7,194,455 B2* | 3/2007 | Zhou et al. | 1/1 |
| 2002/0002452 A1* | 1/2002 | Christy et al. | 704/3 |
| 2002/0107885 A1* | 8/2002 | Brooks et al. | 707/505 |
| 2002/0188670 A1* | 12/2002 | Stringham | 709/203 |
| 2002/0194300 A1* | 12/2002 | Lin et al. | 709/217 |
| 2003/0046062 A1* | 3/2003 | Cartus | 704/10 |
| 2003/0145282 A1* | 7/2003 | Thomas et al. | 715/513 |
| 2004/0068411 A1* | 4/2004 | Scanlan | 704/277 |
| 2004/0122656 A1* | 6/2004 | Abir | 704/4 |
| 2004/0181390 A1* | 9/2004 | Manson | 704/2 |
| 2004/0205674 A1* | 10/2004 | Delgado et al. | 715/536 |

OTHER PUBLICATIONS

Anonymous: "Real-time Email Translation". T-MAIL.COM, [Online], Feb. 13, 2004, XP002299359. Retrieved from the Internet: URL: <http://web.archive.org/web/20040213042735/http://www.t-mall.com/index2.shtml> [retrieved on Oct. 5, 2004.

Anonymous: "Altavista: Translations". BABELFISH.ALTAVISTA. COM[Online]. Dec. 12, 1998, XP002299360. Retrieved from the Internet: URL: <http://web/archive/org/web/19981212012730/http://babelfish.altavista.com/> [retrieved on Oct. 5, 2004].

* cited by examiner

SYSTEM AND METHOD FOR MULTI-LINGUAL TRANSLATION

FIELD OF THE INVENTION

The present invention relates generally to translating a portion of text while composing text and more particularly to a system and method for multi-lingual translation of correspondence, such as email from a mobile device.

DESCRIPTION OF THE RELATED ART

Mobile devices such as wireless communications devices providing data communications, voice communications or both in a wireless communication network are increasingly prevalent in current society. Such devices may also provide additional personal digital assistant (PDA) functions such as a calendar, alarm, contact lists, calculators, etc.

One feature available to many such devices providing data communications capabilities is text-based communications. These forms of communications included electronic mail (email), Instant Messaging (IM), and Short Messaging Service, (SMS), among others where a user sends text to another. Users may compose and send text-based email communications wirelessly as well as receive such communications. Occasionally, a user may desire to send an email in a language (i.e. a second language) which may not be the user's primary language (i.e. a first language) of communication. When composing the email, typing in the text, it is often difficult to remember a specific word or phrase to be typed in the second language. The user knows the word or phrase in the first language but does not remember the word (or its spelling) in the other language.

By way of example, consider the English sentence, "How are you today?" In French, the same sentence may be translated as, "Comment ca va aujourd'hui?"

In this example, the user may forget the French word "aujourd'hui" meaning "today" or forgot how to spell it. It is therefore desirable to be able to provide the equivalent portion of text in a second language on the communications device if the user can remember the portion in a first language.

In addition, for persons whose first language is English, typing on a QWERTY keyboard in a different language is often much slower than typing in English, especially typing a phonetic language such as Chinese in accordance with one of the standard systems for representing symbols phonetically such as Mandarin Pinyin, Cantonese Pinyin, WuBiHua or CangJie. Anecdotal evidence suggests that it can take 3-5 times longer to type a sentence phonetically in Chinese then an equivalent sentence in English. One reason that it takes so long is that Chinese is a phonetic language having no alphabet but based on phonics to sound out words. Further, the language contains over 12,000 characters (symbols). It is difficult to memorize all of these characters to get a good grasp of the language to be able to communicate quickly and fluently. In addition, users might not be familiar with the different Chinese input methods (e.g., Mandarin Pinyin, Cantonese Pinyin, WuBiHua or CangJie). There is a steep learning curve for all of these methods and it may take a user a significant amount of time to recall a specific word or character from these methods when inputting text for a communication.

It would therefore be desirable to have an easy method of inputting text from other languages (particularly non-English languages) to make the input process faster.

One might consider placing an entire translation dictionary (e.g., English to French, English to Chinese, etc) on the wireless communications device, but each of these dictionaries are large and memory intensive in relation to the typical amount of storage available on such devices; it is not a wise use of such limited memory. A system of text retrieval, using a wireless transport is expected to be more effective and efficient.

Accordingly, there is a resulting need for a method and apparatus that addresses one or more of these shortcomings.

SUMMARY

The present invention relates to translation of a portion of text to be communicated in a text-based communication in a communications network. A communications device for composing the text-based communication queries a translation service with a portion of text in a first language to obtain a replacement for the portion in a second language. A user may trigger a replacement query by composing the portion using at least one trigger symbol monitored by the communications device. Replacement may be confirmed with the user and at least one alternative replacement sought in response to the confirmation. The communications network may comprise a wireless network and the communications device a wireless mobile communications device.

In accordance with a first aspect of the invention, in a communications device coupled for communication in a communications network, there is provided a method of translating a portion of a text-based communication for communicating in the communications network. In an embodiment thereof the method comprises determining a portion of text to be translated;

obtaining a replacement for the portion of text from a translation service coupled to the communications device, the translation service translating the portion of text from a first language to a second language; and replacing the portion with the replacement.

The portion may be indicated by at least one trigger symbol adjacent the portion and the step of determining comprise monitoring the composing of the text-based communication for the at least one trigger symbol.

The step of obtaining may comprise:

transmitting a query to the translation service, the query comprising the portion of text; and receiving a response from the translation service, the response comprising the replacement.

The communications network may include a wireless network and, therefore, transmitting and receiving may comprise respectively communicating the query and the response in accordance with a wireless communication protocol.

Preferably, replacing comprises confirming the replacement. As well, confirming the replacement may comprise obtaining at least one alternative replacement from the translation service and replacing comprise replacing using a one of the at least one alternative replacement.

In an embodiment, the method comprises maintaining a store of portions of text and respective replacements on the communications device; and using said store to determine the replacement. The portions of text and respective replacements may be defined by prior translations performed using the communications device.

In accordance with a second aspect of the invention, there is provided a system for translating a text-based communication for communicating in a communications network. In an embodiment thereof, the system comprises:

a translation service coupled to the communications network, the translation service adapted to translate a portion of text in a first language to a replacement for the portion in a second language in response to a query comprising the portion; and a communications device coupled to the communications network for communicating text-based communications, said communications device adapted to obtain from the translation service a replacement for a portion of text of a text-based communication and to replace the portion with the replacement obtained.

In an embodiment, the communications network comprises a wireless communications network and the communications device is coupled for wireless communications to the communications network.

The communications device may comprise a translation component adapted to obtain the replacement in response to a trigger symbol identifying the portion of text.

In accordance with a third aspect, there is provided a mobile device for wirelessly communicating text-based communications in a communications network. In an embodiment thereof, the mobile device comprises:

a composition component to compose text for communicating wirelessly in a text-based communication; and a translation component to replace a portion of the text in a first language with a replacement in a second language for communicating in the text-based communication, said translation component obtaining the replacement from a translation service coupled to the mobile device.

The mobile device may further comprise a monitoring component to monitor the text during a composing of text to determine the portion to be replaced. The monitoring component may monitor the text for at least one trigger symbol adjacent the portion to determine the portion.

The translation component can comprise a user interface to confirm the replacement to replace the portion. Preferably, the translation component is adapted to obtain at least one alternative replacement from said translation service and wherein said user interface is adapted to confirm a one of the at least one alternative replacement to replace the portion.

In accordance with a fourth aspect, there is provided a translation server providing a translation service to a communications network. In an embodiment thereof, the server comprises:

a receiving component for receiving a query request from a communications device for translating a portion of text of a text-based message for communicating by the communications device in the communications network;

a translating component for translating the portion of text in a first language to a replacement for the portion in a second language; and a transmitting component for transmitting a response including the replacement to the communications device for replacing the portion of text in the text-based message.

The translation server may also include a memory module for storing the response.

The translation component may be adapted to determine at least one alternative replacement in response to the query request and the transmitting component adapted to transmit the response including the at least one alternative replacement.

Other aspects including further method and computer program-related aspects will be apparent to those of ordinary skill in the art.

BRIEF DESCRIPTION OF THE DRAWINGS

Embodiments of the present invention will now be described by way of example with reference to attached figures, wherein.

DETAILED DESCRIPTION

Figure 1:
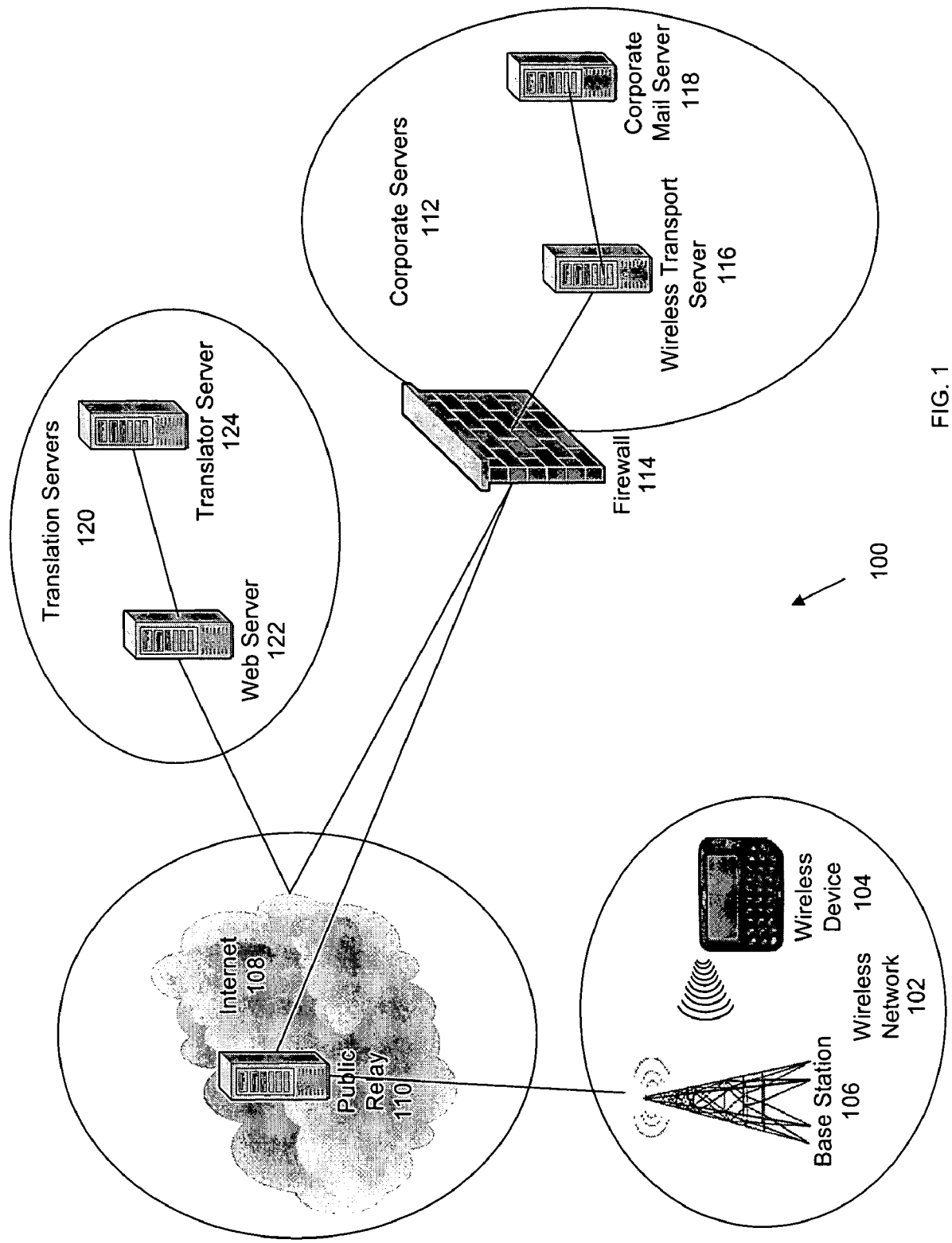
FIG. 1 is a schematic diagram of a translation system architecture in accordance with an embodiment of the invention.

FIG. 1 is a schematic illustration of an architecture for a translation system 100 in accordance with an embodiment of the invention. Translation system 100 comprises a wireless communication device 104 coupled for communicating wirelessly with a wireless network base station 104 across a wireless network 102. Wireless network 102 may conform to any of the wireless network technologies and protocols capable of supporting data communications including cellular, wide-area network, GSM, GPRS, CDMA, iDEN™, Mobitex™, etc.

Wireless communication device 104 is capable of composing and sending data communications including text for delivery through wireless network 102 in accordance with one or more protocols implemented by the network 102. Text-based communications may comprise email, IM, SMS, direct data access or other protocols for such communications. Base station 106 is further coupled for communication to the public Internet 108 via a public relay 110 which receives messages from device 104 and directs the messages to corporate servers 112 providing data communications services to the wireless device. Corporate servers 112 are fronted by a firewall 114 and comprise a wireless transport server 116 and corporate email server 118. Wireless transport servers may include but are not limited to BlackBerry™ Enterprise Server, a wireless access protocol (WAP) gateway or a SMS server.

Though wireless transport server 116 is shown connected to corporate mail server 118 such as via a local area network (LAN) within an organization, wireless transport server 116 may be further connected to other application servers such as a web server 122 and a translator server 124 in the LAN environment behind firewall 114.

In the illustrated embodiment of this invention, the wireless transport server 116 sends a request to translation servers 120 through the corporate firewall 114, across the Internet 108 to the translation servers 120.

Translation servers 120 include a web server 122 that receives a request for translation which then passes it on to translator server 124 to translate the required request. Though illustrated as separate computing devices, persons of ordinary skill in the art will appreciate that any of corporate servers 112 and translation servers 120 and firewall 114 may be combined on one or more shared computing devices and that various design choices will dictate specific network topologies.

Once translation is completed, communication occurs in the reverse: translator server 124 sends the response to web server 122 to send via Internet 108 to wireless transport server 116 (through corporate firewall 114), which forwards the response across public relay 110, to wireless base station 106 to be delivered to the initiating application on wireless device 104.

Figure 2:
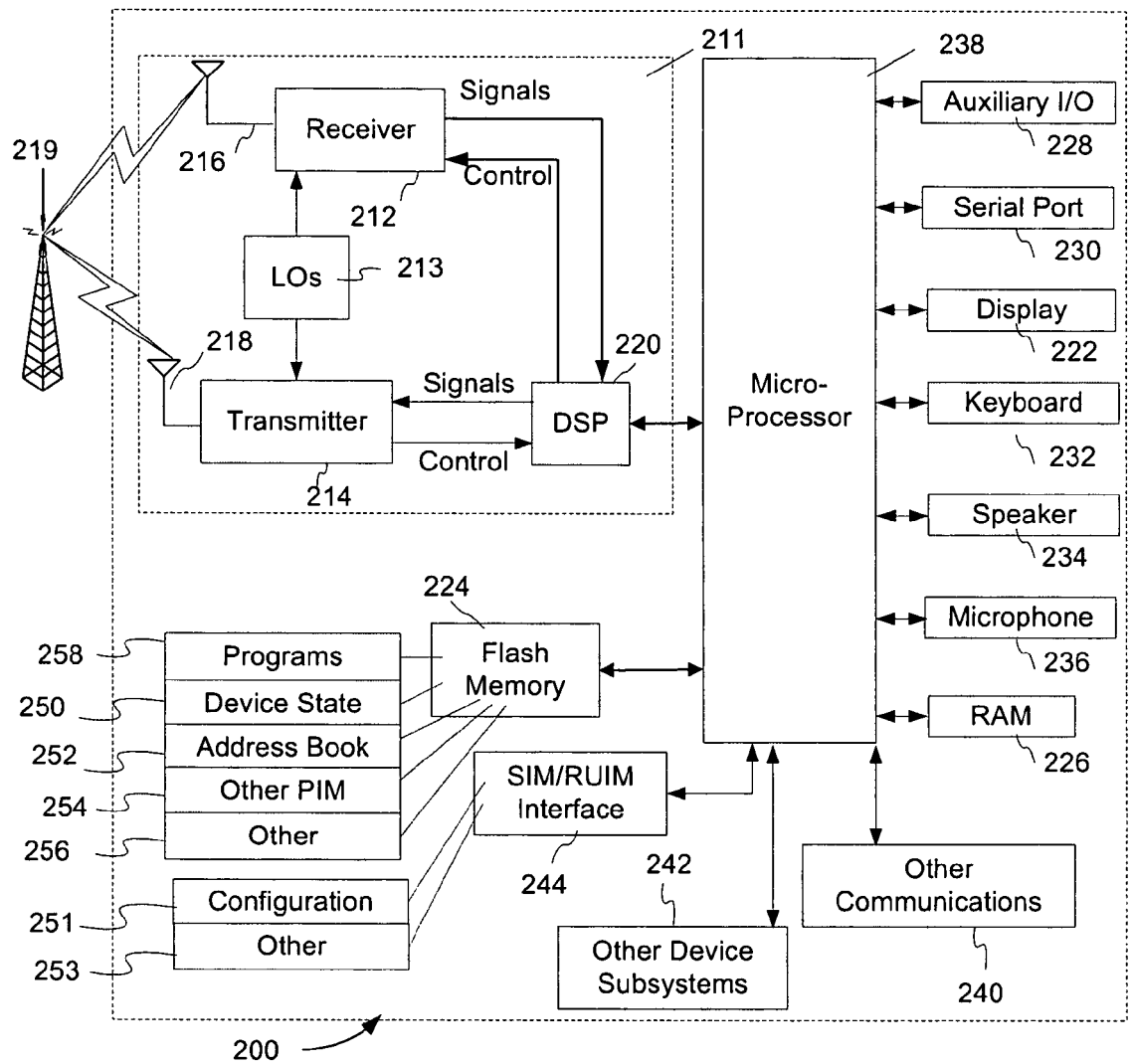
FIG. 2 is a detailed diagram of a preferred wireless communication device of FIG. 1 in accordance with an embodiment of the invention.

FIG. 2 is a block diagram illustrating an embodiment of wireless communications device 104 comprising a mobile electronic device 200 including preferred embodiments of the apparatus and method of the current application. Mobile electronic device 200 is preferably a two-way wireless electronic communication device having at least voice and data communication capabilities. Mobile electronic device 200 preferably has the capability to communicate with other computer systems on the Internet. Depending on the specific functionality provided, the wireless device may be referred to as a data messaging device, a two-way pager, a wireless e-mail device, a cellular telephone with data messaging capabilities, a wireless Internet appliance, or a data communication device, as examples.

Where mobile electronic device 200 is enabled for two-way communication, it incorporates a communication antenna subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the communication subsystem 211 is dependent upon the protocols of the wireless communications network in which the device 200 is intended to operate.

Mobile electronic device 200 preferably includes a microprocessor 238 that controls the overall operation of the device. Communication functions, including at least data and preferably voice communications, are performed through communication subsystem 211. Microprocessor 238 also interacts with further device subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242.

Figure 3:
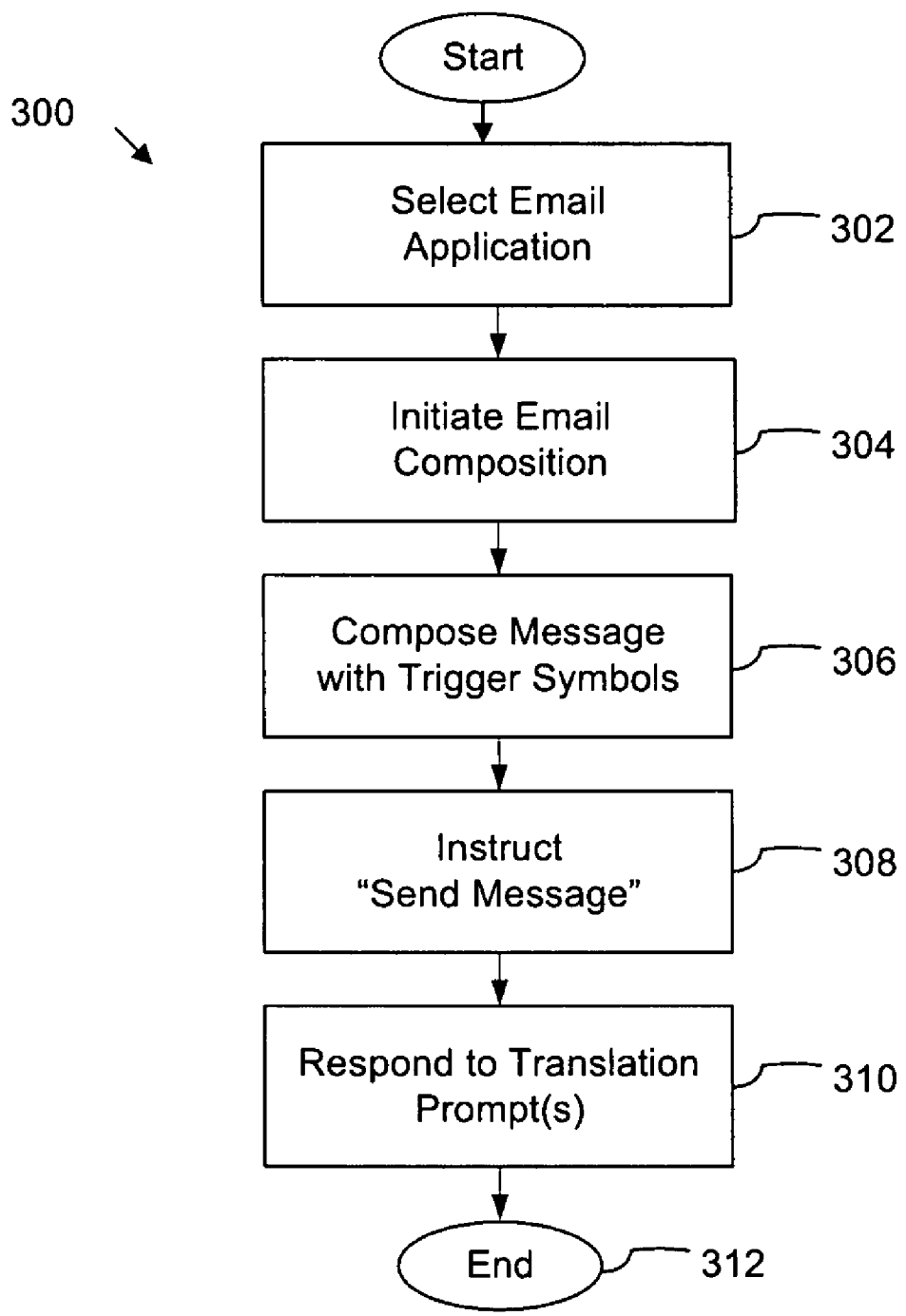
FIG. 3 is a flowchart of operations of a user interaction with a user interface of a communications device in accordance with an embodiment of the invention.

With reference to FIG. 3, there is shown a flowchart for operations 300 of a user interface providing selection and composition interaction with a mobile device, such as device 200, adapted for translating in accordance with an embodiment of the invention. In the present example, the mobile device is adapted for providing translation operations to at least email communications. Persons of ordinary skill in the art will appreciate that the invention is not limited to translation for email but may be adapted to other forms of data communication, including IM and SMS as previously noted.

In accordance with this embodiment, operations 300 commence when a user selects an application that provides translation, in this case, the email application (step 302). The user initiates the composition of an email message (step 304), for example by invoking a menu option, and composes the message using wildcards or trigger symbols to indicate a desired word or words to be translated and replaced in the email in accordance with the embodiment of the invention (step 306). A user may indicate a word or phrase for translation.

Though not shown, the user interface may be adapted to permit a user to select the languages for translating from and to and such information may be provided with a translation query as described below.

In the present embodiment, the trigger symbol is the asterisk character (*) and it is placed adjacent and around the portion of text to be replaced (i.e. immediately before and after the text, as in *today*). As part of the adaptation of the mobile device, there may be provided a wildcard monitor object that monitors the composition to recognize the wildcards and identify the portion of text to be translated and replaced. Persons of ordinary skill in the art will appreciate that other single or multiple symbols may be used and that depending on the sophistication of the monitoring operations and translation limitations, trigger symbols need not enclose the whole of the text to be replaced. For example, a single leading or trailing symbol could be used. A first specific symbol could indicate that the next word is to be replaced and a second specific symbol could indicate that the next two words are to be replaced. Other variations will be apparent.

Though described further below with reference to FIGS. 4A and 4B, upon the wildcard monitor object's determination of the portion of text to be replaced, the mobile device formulates a query including the portion (and language information, if required) and sends the query for translation by the translation server 124. The mobile device receives a query response and stores the response for presentation to the user prior to sending the message.

When the user has finished composing and invokes a "send message" instruction operation for the message (step 308), the user interface provides a translation dialog prompt. A send instruction monitor may also be provided to enable this feature as discussed further below. At step 310 the user responds to the prompt for each portion of text to be replaced to confirm the replacement. In an embodiment of the prompt, there is provided three (3) choices for a user response: Yes (accept translation), No (reject translation) or No, retrieve other words (go back to the server to receive other choices).

Once the user has responded to the prompts and confirmed each translation replacement, the message may be sent and operations end (312).

Figure 4A:
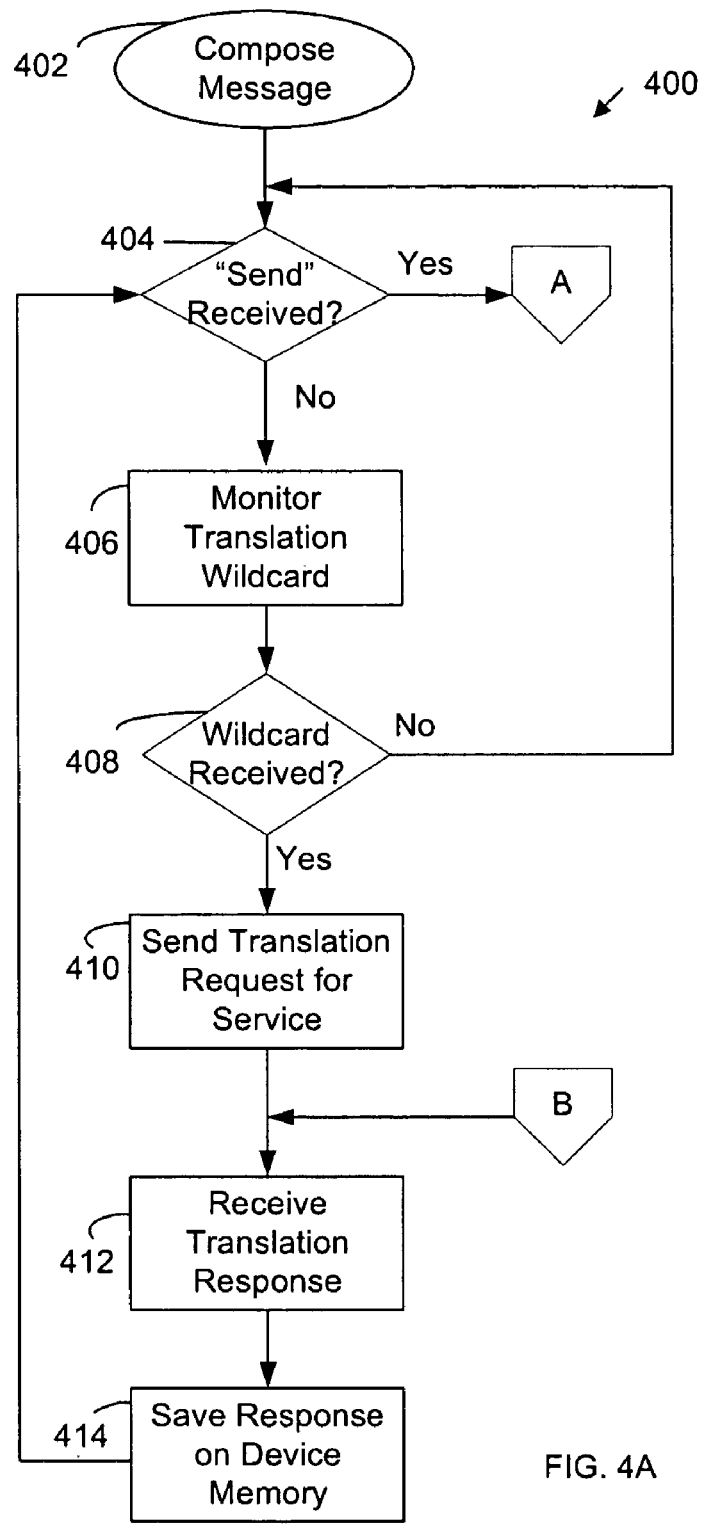
FIGS. 4A and 4B are flowcharts which describe a method for providing translation on a wireless communication device in accordance with an embodiment of the invention.
Figure 4B:
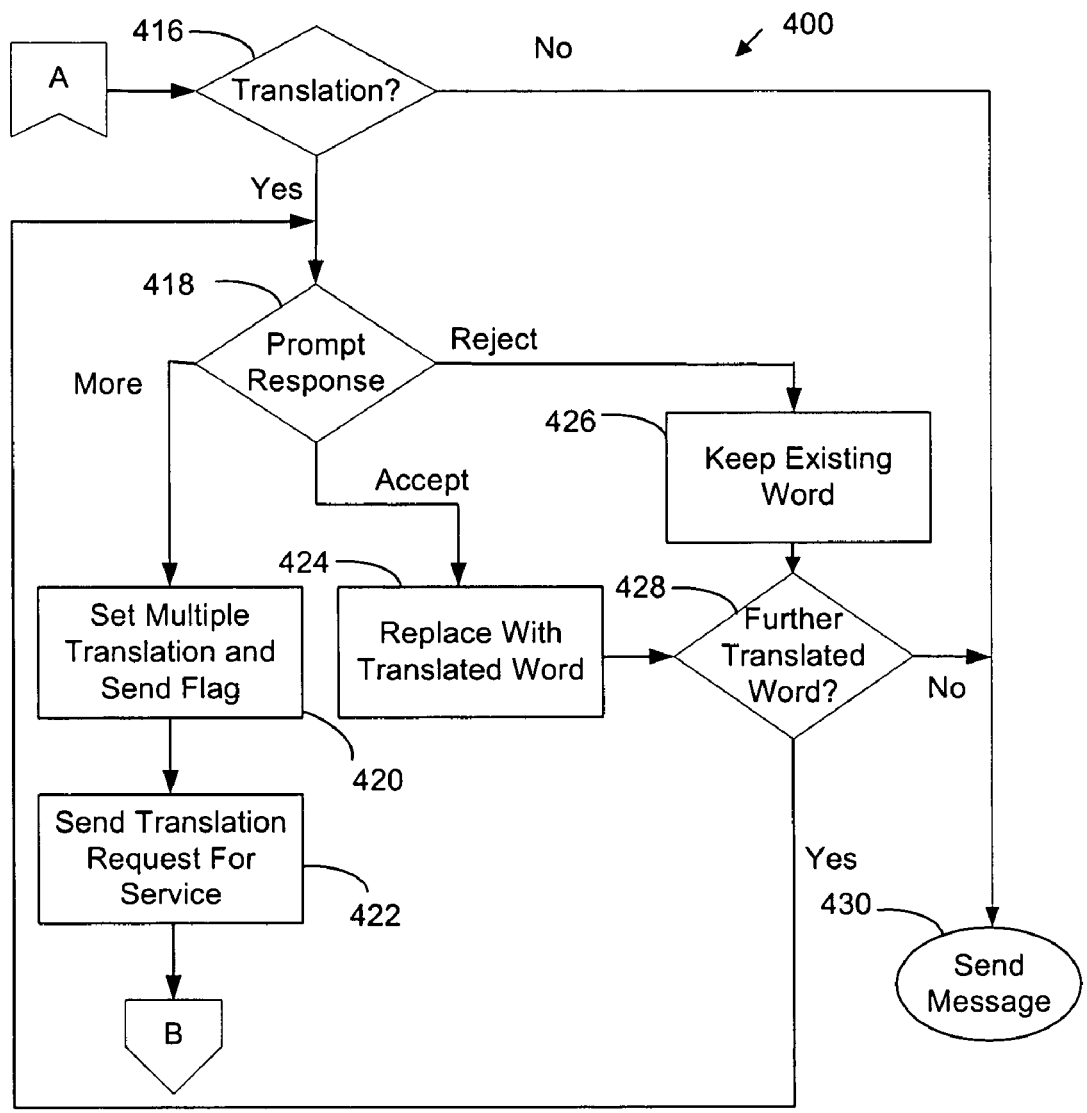

FIGS. 4A and 4B illustrate operations of a mobile device providing a method of translation in accordance with the user interface operations described with reference to FIG. 3. Operations 400 start when a user initiates the composing of a message (step 402). A translation application component (e.g. a "Send Message" listener object) monitors to see whether a "Send Message" request (step 404) is received on device 200 from the user. If it is not received, another translation application component (e.g. a wildcard monitor object) monitors the email under composition for translation wildcards indicating a word or other portion of text to be replaced (step 406). If a wildcard is received (step 408) the device formulates a translation query request for the translation server 124 and sends translation request for a response (step 410). Optionally, the queries may include authorization information to authenticate a query request for translation service as discussed below.

If at step 408 no wildcard is received 408, the wildcard monitor object will continually monitor for one until one is received and the listener object will similarly monitor for send message instructions. Thus operations appear to loop via No branch at step 408 back to step 404 until one of a send and wildcard are received.

Following the Yes branch from step 410 to step 412, a response is received from the translation server 124 including a replacement for the portion of text to be translated and the response is reserved, such as by saving to a memory of the device, for later presentation to the user (step 414). At step 414, operations repeat from step 404. To facilitate management of queries and responses, each query that is generated may be created with two unique identifiers, one which identifies a particular translation matter and another that identifies the user. A response to a particular query may then return the unique identifiers to coordinate response and query matching.

At step 404, if a send message instruction is received from the user, then operations 400 continue via Yes branch to connecting reference A of FIG. 4B. Though not shown, the listener object may be adapted to listen for cancel instructions and cancel email composition accordingly.

With reference to FIG. 4B, operations 400 continue at step 416 where a determination is made whether a translation has been received. If it is determined that there is no translation at step 416, translation operations end and the email application may send the message. However if at least one translation response exists, a user interface component of the translation application prompts the user to confirm each translation response (step 418) as discussed above. The prompt provides three (3) choices 1. Accept; 2. Reject; and 3. Reject & Ask for More.

If the user choice is to reject the response word, the existing word in the first language is kept (step 426).

At step 428 a determination is made as to whether any additional responses require confirming. If there is no further response to confirm, translation may end and the device can send the message (step 430).

However if there is a further replacement to confirm (step 428), operations loop back to step 418 to prompt the user to confirm the replacement for the next portion of text to be replaced.

At step 418, if the user decides to accept the replacement to replace the portion of text, the existing portion is replaced (step 424) and operations continue at step 428 as described.

Lastly, at step 418, if the user instructs to get more translations, a further query for the existing portion of text is formulated including a multiple translation flag for sending to the translation servers (step 420) requesting more than one possible replacement, if available. A flag to force a send message instruction for the local device may also be set to ensure that operations at step 404 complete as necessary. The translation query request is sent for service (step 422) and operations 400 continue via reference B of FIG. 4A. With reference to FIG. 4A, at step 412, a multiple translation response is received and reserved in device memory at step 414. The response received may include a flag or other information denoting that the response is a multiple translation response. As described previously, operations loop back to step 404. The send flag triggers operations to continue via the yes branch back to step 416 as previously described.

Persons of ordinary skill in the art will recognize that operations of step 418 may be modified to account for a response having a plurality of replacements that may be used fro replacing the portion of text. For example, the prompt may allow a user to highlight and accept a specific replacement or reject all.

Figure 5:
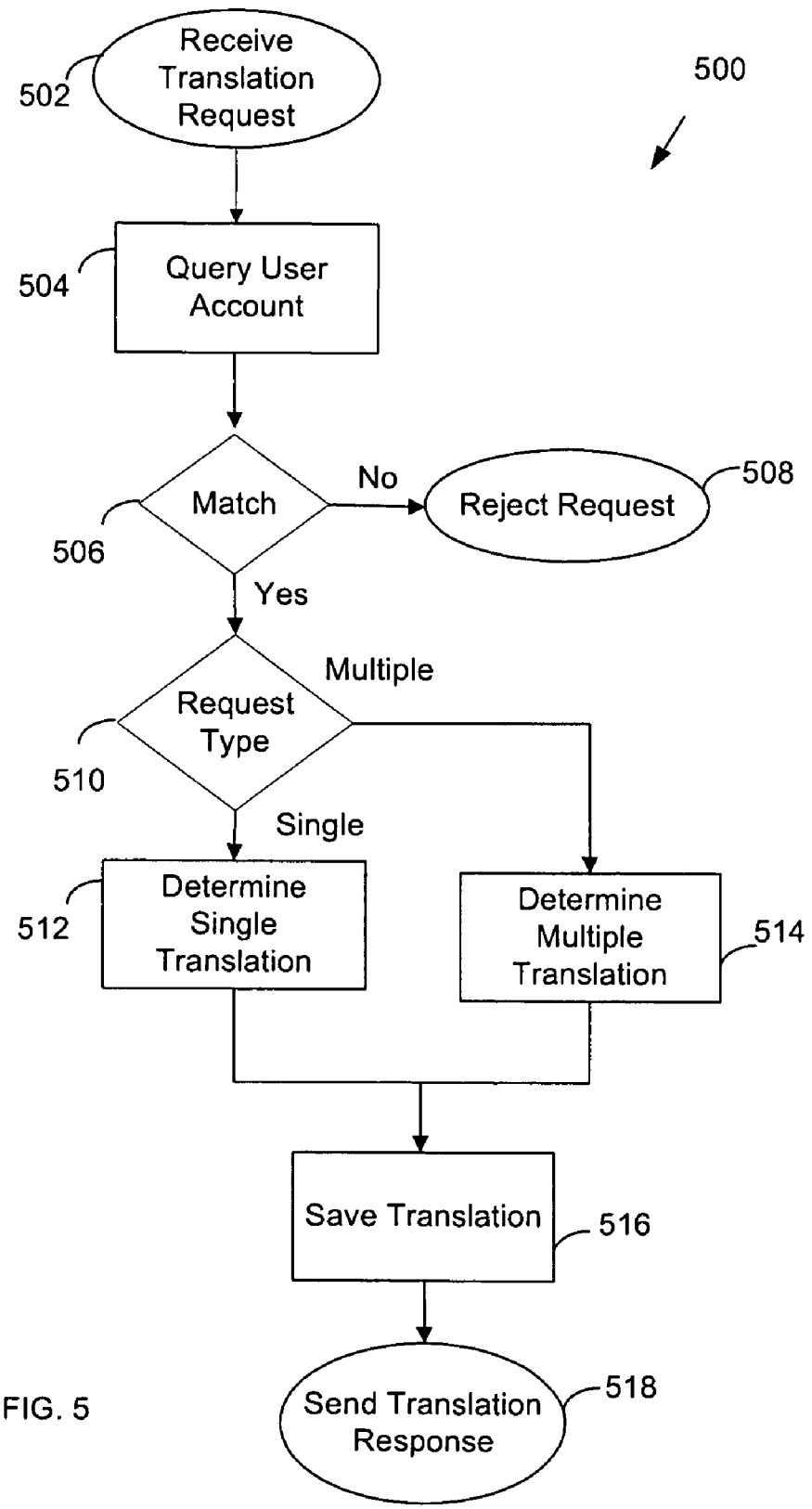
FIG. 5 is a flowchart of operations of translation server providing a translation service in accordance with an embodiment of the invention.

FIG. 5 illustrates operations 500 for a server translation method for translation servers 120 adapted in accordance with the present embodiment of the invention to provide a translation service. In the present embodiment, the translation service responds to requests for translation described above with reference to FIGS. 3, 4A and 4B.

Broadly, operations 500 commence with the receipt at the translation server 124 of a request for a word translation (step 502). In accordance with an optional feature, each request comprises authorization information, for example, a user account identifier or to facilitate authentication of the request. Steps 504 to 508 perform authentication, querying a user account store (not shown) of the translation servers 120 and determining whether there is a match. If no match is found at step 506, the request is rejected without a response at step 508. Other authorization techniques will be apparent to those of ordinary skill in the art.

Otherwise, at step 510, the request type is determined. If the request is for a response comprising a single translation of the word to be replaced, a single response is formulated (step 512).

If the request is for multiple translations (i.e., the user requests the translation servers to find at least one alternative replacement translation from which the user may chose a translation to replace the word to be translated), the operations formulate a multiple translation response, if possible (step 514). It is understood that some requested words may not have multiple translations and a response to a multiple translation request may repeat the earlier provided replacement.

Translation is performed using the portion of text provided in the query. Language information may be determined from the query or in other manners. For example, it may be associated with authorization information. Thus multi-lingual translation may be provided. Alternatively, queries for particular language pair translation may be directed to a dedicated server for the language pair.

From steps 512 or 514, the respective single or multiple translation response may be saved at step 516 and the response sent, ending operations 500. Saving, though optional, may be performed for a variety of advantages. One such advantages is facilitating a further search for the same word for the user, (e.g. multiple response search) which may provide quicker response times than seeking the translation from a remote store coupled to the translation server. As well, storing may be useful to provide statistical data such as detailed and/or aggregated information users, words and translations.

Advantageously, a major portion of the proposed translation operations can work in the background while a user composes an email. As such, when composition is completed the likelihood is increased that the translation service operations and the receipt of the response by the communications device are completed. Thereafter, the user confirms any replacement translation and the email is completed for sending.

Persons skilled in the art will recognize that the formulating and sending of translation requests by the mobile device may be performed upon demand from a user, for example, by invoking a translate message request option, or initiated upon receipt of the send message instruction rather than anticipated by the wildcard monitor as described. Such delayed rather than anticipated action may be preferred to avoid obtaining a translation of a word which a user does not require to be translated. Additionally, the wildcard monitoring object may be adapted to delay by a short period of time the preparation of a request following the detection of the triggers to permit a user to change or even delete the word to be translated. Should the translation request be sent too quickly upon detection of the trigger symbol, an undesired portion of the text may be translated. The portion may be undesired because it is premature due to an uncorrected spelling or because the user changes his or her mind about the content of the message.

Though the embodiments thus described relate to translation of portions of text for wireless data communications and include the wireless communication of translation requests and responses, persons of ordinary skill in the art will appreciate that the embodiments may be adapted to a wired environment. That is a computing device such as a personal computer, laptop, workstation, terminal, PDA or the like coupled for wire-based communication to the translation servers may be adapted for word translation in accordance with the teachings of the invention.

Additionally, in a further embodiment (not shown), the communications device may include a local dictionary stored to a memory of the device for looking up a replacement for a portion of text. The dictionary may comprise a subset of a larger translation dictionary such as common words. However, as noted previously, consideration of local memory availability may make a local store difficult for some devices. In yet a further embodiment (not shown), a local store of previously translated portions and replacements may be maintained by a device. The device may store the portions and replacements automatically or upon a confirmation of a user. As the local store fills an available allotted portion of local memory, one or more aging or frequency mechanisms may be used to free space for new portions and words. The device may then query its own local store before generating a query to a remote translation service coupled to the device.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. In a wireless communications device, a method comprising:
   during composition of a text-based communication, determining a portion of inputted text of the text-based communication to be translated by monitoring the text-based communication for the presence of a trigger symbol inputted into the text during composition of the text, the trigger symbol indicating the portion of text to translate;
   sending a translation request, the translation request configured for reception by a translation service server and comprising the portion of text to be translated;
   receiving and storing a translation of the portion of text from a first language to a second language;
   stopping the monitoring of the text-based communication upon receiving instructions indicating that the text-based communication is to be sent;
   providing a prompt, the prompt corresponding to the portion of text and further where the prompt comprises the translation of the portion of text;
   when a response to the prompt indicates replacement of the portion of text, replacing the portion of text in the text-based communication with the translation; and
   sending the text-based communication.

2. The method of claim 1 wherein said replacing comprises receiving instructions confirming the translation.

3. The method of claim 1 wherein the response to the prompts indicate a request for an alternative translation, wherein replacing the portion of text comprises obtaining at least one alternative replacement from said translation service server and replacing the portion of text using a one of the at least one alternative replacement.

4. The method of claim 1 comprising maintaining a store of portions of text and respective translations on said communications device; and using said store to determine the translation for the portion of text.

5. The method of claim 4 wherein the store of portions of text and respective translations is defined by prior translations.

6. The method of claim 1, wherein the response to the prompt comprises any of:
   an 'accept translation' response representing instructions that said translation is to be used to replace the portion of text
   a 'reject translation' response representing instructions that the portion of text is to be retained instead of replacing it with said translation; and
   a 'reject and ask for more' response representing instructions to obtain one or more alternative translations.

7. The method of claim 3, further comprising, before replacing the portion of text, providing at least one further prompt, wherein the further prompt enables a selection of one of said one or more alternative translations to replace the portion of text or to reject all of said one or more alternative translations.

8. A system comprising:
   a processor for executing computer-readable instructions that, when executed, causes the system to:
      during composition of a text-based communication, determine a portion of inputted text of the text-based communication to be translated by monitoring the text-based communication for the presence of a trigger symbol inputted into the text during composition of the text, the trigger symbol indicating the portion of text to translate;
      send a translation request, the translation request configured for reception by a translation service server and comprising the portion of text to be translated;
      receive and storing a translation of the portion of text from a first language to a second language;
      stop the monitoring of the text-based communication upon receiving instructions indicating that the text-based communication is to be sent;
      provide a prompt, the prompt corresponding to the portion of text and further where the prompt comprises the translation of the portion of text;
   when a response to the prompt indicates replacement of the portion of text, replace the portion of text in the text-based communication with the translation; and
   send the text-based communication.

9. The system of claim 8, wherein the computer-readable instructions, when executed, further causes the system to receive the response to the prompt, the response comprising any of:
   an 'accept translation' response representing instructions that said translation is to be used to replace the portion of text;
   a 'reject translation' response representing instructions that the portion of text is to be retained instead of replacing it with said translation; and
   a 'reject and ask for more' response representing instructions to obtain one or more alternative translations.

10. The system of claim 8 wherein the response to the prompt indicates a request for an alternative translation, and wherein the computer-readable instructions, when executed, further causes the system to, in order to replace the portion of text, obtain at least one alternative replacement from the translation service server and replace the portion of text using a one of the at least one alternative replacement.

11. The system of claim 10, wherein the computer-readable instructions, when executed, further causes the system to, before replacing the portion of text, provide at least one further prompt, wherein said further prompt enables selection of one of said one or more alternative translations to replace the portion of text or to reject all of said one or more alternative translations.

12. The system of claim 8 wherein the computer-readable instructions, when executed, further causes the system to, in order to replace the portion of text, receive instructions confirming the translation.

13. The system of claim 8 further comprising a memory coupled to the processor for maintaining a store of portions of text and respective translations, wherein the translation is determined using the store.

14. The system of claim 13 wherein the store of portions of text and respective translations is defined by prior translations.

15. A mobile device comprising a processor for implementing:
- a composition component to compose text in a text-based communication; and
- a translation component configured for:
  - during composition of the text-based communication, determining a portion of inputted text of the text-based communication to be translated by monitoring the text-based communication for the presence of a trigger symbol inputted into the text during composition of the text, the trigger symbol indicating the portion of text to translate;
  - sending a translation request, the translation request configured for reception by a translation service server and comprising the portion of text to be translated;
  - receiving and storing a translation of the portion of text from a first language to a second language;
  - stopping the monitoring of the text-based communication upon receiving instructions indicating that the text-based communication is to be sent;
  - providing a prompt, the prompt corresponding to the portion of text and further where the prompt comprises the translation of the portion of text;
  - when a response to the prompt indicates replacement of the portion of text, replacing the portion of text in the text-based communication with the translation; and
  - sending the text-based communication.

16. The mobile device of claim 15 wherein the translation component comprises a user interface to confirm the translation to replace the portion of text.

17. The mobile device of claim 15 wherein the translation component is adapted to, when the response to the prompt indicates a request for an alternative translation, obtain at least one alternative replacement from said translation service server for replacing the portion of text.

18. The mobile device of claim 15, wherein the translation component is configured to receive the response to the prompt, the response comprising any of:
- an 'accept translation' response representing instructions that said translation is to be used to replace the portion of;
- a 'reject translation' response representing instructions that the portion of text is to be retained instead of replacing it with said translation; and
- a 'reject and ask for more' response representing instructions to obtain one or more alternative translations.

19. The mobile device of claim 17, wherein the translation component is configured to, before replacing the portion of text, provide at least one further prompt, wherein said further prompt enables selection of one of said one or more alternative translations to replace the portion of text or to reject all of said one or more alternative translations.

20. The mobile device of claim 15 further comprising a memory coupled to the processor for maintaining a store of portions of text and respective translations, wherein the translation is determined using the store.

21. The mobile device of claim 20 wherein the store of portions of text and respective translations is defined by prior translations.

* * * * *